(12) United States Patent
Gupta et al.

(10) Patent No.: US 7,377,638 B2
(45) Date of Patent: May 27, 2008

(54) FOUR ZONE MULTIFOCAL LENSES

(75) Inventors: Amitava Gupta, Roanoke, VA (US); Shyamy Sastry, Roanoke, VA (US); C. Benjamin Wooley, Roanoke, VA (US)

(73) Assignee: Essilor International (Compagnie Generale d'Optique), Charenton Cedex (FR)

( * ) Notice: Subject to any disclaimer, the term of this patent is extended or adjusted under 35 U.S.C. 154(b) by 0 days.

(21) Appl. No.: 10/440,967

(22) Filed: May 19, 2003

(65) Prior Publication Data

US 2004/0233384 A1    Nov. 25, 2004

(51) Int. Cl.
*G02C 7/06*    (2006.01)
(52) U.S. Cl. ............ 351/168; 351/169; 351/164; 351/177
(58) Field of Classification Search ........ 351/159, 351/160 R, 161, 163–4, 168–9, 171, 177
See application file for complete search history.

(56) References Cited

U.S. PATENT DOCUMENTS

| | | | | |
|---|---|---|---|---|
| 1,923,572 A | | 8/1933 | Glancy | 351/171 |
| 2,274,143 A | * | 2/1942 | Houchin | 351/171 |
| 2,755,706 A | | 7/1956 | Cole | 351/171 |
| 2,770,168 A | | 11/1956 | Tesauro | 351/57 |
| 4,786,160 A | | 11/1988 | Fuerter | 351/169 |
| 5,112,351 A | * | 5/1992 | Christie et al. | 623/6.28 |
| 5,305,028 A | | 4/1994 | Okano | 351/169 |
| 5,777,716 A | * | 7/1998 | Miura | 351/169 |
| 5,812,237 A | * | 9/1998 | Roddy | 351/169 |
| 5,864,378 A | * | 1/1999 | Portney | 351/160 R |
| 6,149,271 A | * | 11/2000 | Menezes et al. | 351/169 |
| 6,260,966 B1 | * | 7/2001 | Sawano et al. | 351/161 |
| 6,540,353 B1 | * | 4/2003 | Dunn | 351/161 |
| 6,669,337 B2 | * | 12/2003 | Welk et al. | 351/169 |
| 6,860,599 B2 | * | 3/2005 | Fuschi | 351/168 |
| 7,004,585 B2 | * | 2/2006 | Lindacher | 351/161 |

FOREIGN PATENT DOCUMENTS

WO    WO 03/007054    1/2003

OTHER PUBLICATIONS

PCT International Search Report, dated Oct. 27, 2004, for PCT Int'l. Appln. No. PCT/US2004/014961.

* cited by examiner

*Primary Examiner*—Jessica T Stultz
(74) *Attorney, Agent, or Firm*—Occhiuti Rohlicek & Tsao LLP

(57) ABSTRACT

The present invention provides multifocal lenses containing at least four zones of different refractive power. The zones are positioned such that the wearer is able to use the inferior-most portion of the lens to more clearly, as compared to conventional multifocal lenses, view objects at distances more than 45 cm from the eye.

12 Claims, 1 Drawing Sheet

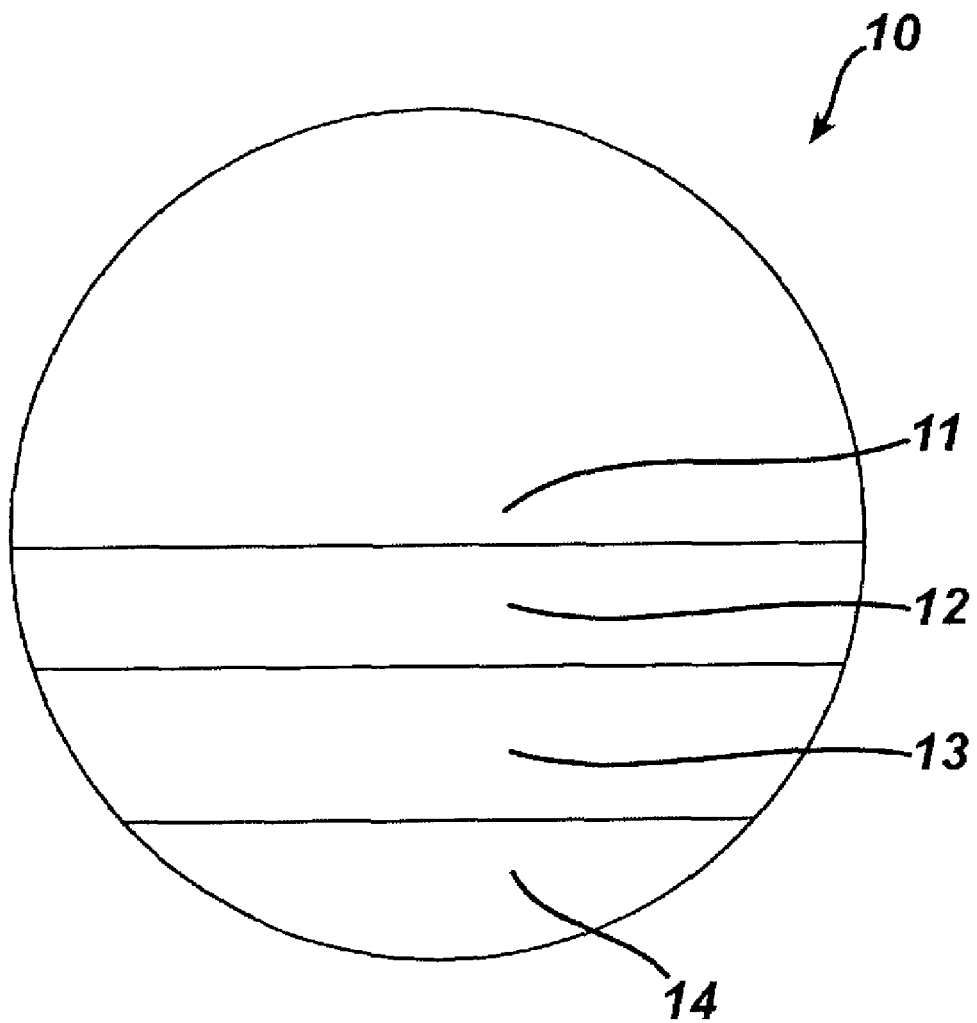

FOUR ZONE MULTIFOCAL LENSES

FIELD OF THE INVENTION

The present invention relates to multifocal lenses. In particular, the invention provides a multifocal lens that has four zones of refractive power.

BACKGROUND OF THE INVENTION

The use of ophthalmic lenses for the correction of ametropia is well known. For example, multifocal lenses, such as progressive addition lenses ("PALs"), are used for the treatment of presbyopia. Typically, the progressive surface of a PAL has three zones, one zone each of far, intermediate, and near vision power. This refractive power is provided in a gradual, continuous progression of vertically increasing dioptric power from far to near focus, or top to bottom of the lens.

One disadvantage of the conventional progressive lens is that the inferior-most portion of the lens contains the add power, or near vision correction power. This placement of the add power is convenient when the lens wearer is reading. However, the lens wearer frequently performs tasks requiring the viewing of objects through the lower portion of the lens, which objects are outside of the near vision range, making this placement problematic. For example, when a PAL wearer walks down a staircase, the image of the stairs appears blurred and rounded when the lens wearer looks through the inferior-most region of the lens. The reason for this is that the stairs are more than 45 cm from the wearer's eye and the wearer is looking through the near vision zone of the lens, which zone cannot provide the refractive power for clear visualization of the stairs. Therefore, a need exists for a progressive addition lens in which this disadvantage is overcome.

BRIEF DESCRIPTION OF THE DRAWINGS

FIG. 1 depicts a plan view of a surface of a lens of the invention.

DESCRIPTION OF THE INVENTION AND ITS PREFERRED EMBODIMENTS

The present invention provides multifocal lenses, and methods for producing the lens, which lenses contain at least four zones of refractive power. The zones are positioned such that the wearer is able to use the inferior-most portion of the lens to more clearly, as compared to conventional PALs, view objects at distances more than 45 cm from the eye.

In one embodiment, the invention provides a multifocal spectacle lens, comprising, consisting essentially of, or consisting of at least four zones of differing refractive power. The four zones may be of any desired refractive power. Preferably, the four zones are a far vision zone, a first intermediate vision zone, a near vision zone, and a second intermediate vision zone. More preferably, the four zones form a progressive surface. For purposes of the invention, by "progressive addition surface" or "progressive surface" is meant a continuous, generally differentiably continuous, or discontinuous aspheric surface. By "discontinuous" is meant that there is a discontinuity which is either a discontinuity in one or more functions describing the surface geometry or a discontinuity in the slope of the surface at any point $\partial(z)/\partial(x,y)$ of the surface.

In FIG. 1 is depicted one embodiment of lens of the invention. Lens 10, from superior to inferior, or top to bottom, of the lens, has distance vision zone 11, first intermediate vision zone 12, near vision zone 13, and second intermediate zone 14. In lens 10, and in all embodiments of the invention, preferably the distance vision zone is a zone of refractive power suitable for correcting the distance vision acuity of the lens wearer. The first intermediate vision zone, between the far and near vision zones, is a zone of refractive power connecting the far and near vision zones. The refractive power in the first intermediate zone continuously increases in power across the zone from that of the distance vision zone to that of the near vision zone. This first intermediate vision zone provides refractive power for viewing objects at an intermediate distance, typically about 45 to about 60 cm from the lens wearer's eye. The near vision zone preferably provides refractive correction for the lens wearer's near vision acuity.

The second intermediate vision zone is preferably located at the inferior-most portion of the lens and adjacent to the near vision zone. The refractive power of this zone gradually decreases, from the point at which the zone adjoins the near vision zone, from the near vision power to a minimum power that is greater than about 25, preferably greater than about 25% to about 75%, and more preferably about 35 to about 75%, of the lens' add power. By "add power" is meant the amount of dioptric power difference between the near and far vision zones of the lens along the central, or 90-270 degree, meridian of the lens. The power of the second intermediate zone preferably continuously decreases so that the minimum power is located at the inferior-most portion of the second intermediate zone. It is a discovery of the invention that, by providing a second intermediate vision zone, the lens wearer's depth of vision is enhanced for tasks that require less refractive power than is provided by the near vision zone of the lens.

The precise amount of reduction in power to be provided by the second intermediate power zone will be determined by the magnitude of the lens' add power and the residual accommodation maintained by the lens wearer. It is known that a person typically maintains a residual accommodation of 1.00 to 1.50 diopters even when the natural lens has substantially no accommodating power. Additionally, the image blur resulting from power up to a maximum of 0.5 diopters of add power will be tolerable to the majority of PAL wearers. Thus, a reduction of at least 1.00 diopter is needed for a progressive addition lens with an add power of 3.00 diopters in order to substantially restore the depth of field for walking down a set of stairs or along a sidewalk.

At the point at which individuals who are first diagnosed as presbyopes, they generally retain most of their accommodative ability and are fitted with PALs with an add power between about 1.00 to 1.50 diopters. These presbyopes likely will not require any reduction in power to reduce image blur. Thus, the lenses of the invention may find particular utility in PAL wearer's who require more than 1.50 diopters of add power.

In addition to reducing the image blur experienced by a PAL wearer when looking at objects at or near their feet, the reduction in add power provided by the second intermediate zone serves to reduce magnification along the horizontal meridians of the lens. The magnitude of image magnification is reduced along the horizontal meridians in the second intermediate zone as result of the decrease in spherical power in that zone. Thus, straight edges of an object that may look curved when viewed through the typical PAL near vision zone will appear less curved when viewed through the second intermediate zone of the lens of the invention. In order to provide a substantially reduced image magnification and provide a substantial increase in depth of focus, the reduction in power in the second intermediate zone preferably is as set forth in the table below:

| Add Power | 1.00 D | 1.50 D | 2.00 D | 2.50 D | 3.00 D |
|---|---|---|---|---|---|
| Lower Limit | 50% | 45% | 35% | 35% | 35% |
| Upper Limit | 50% | 50% | 50% | 60% | 67% |

The location of the superior-most border of the second intermediate vision zone is preferably about 15 to 25 mm, preferably about 15 to 21 mm below the fitting point of the lens. By "fitting point" is meant the point on a lens that aligns with the wearer's pupil in its distance viewing position when the wearer is looking straight ahead and at which point the lens correction is that needed to correct the wearer's distance vision acuity. This preferred location for the second intermediate zone takes into account the length of both the first intermediate and near vision zones. Thus, the lower value of this range may be attained using PAL's with short first intermediate zone lengths, meaning lengths of about 11 to 15 mm. The upper limit of the range may be attained using PAL's with long first intermediate zone lengths, meaning a length of about 16 to about 18 mm.

The length of the second intermediate zone will be dependent upon the gradient, or rate of reduction, in the second intermediate zone of the power in this zone and preferably is about 3 to 9 mm. The gradient of reduction is ideally equal to or less than the gradient of the increase in spherical power in the first intermediate zone from the far vision zone to the near vision zone. A reduction of power in the second intermediate zone of 35% of the add power in a lens with a channel length of 16 mm requires a length of about 5.6 mm or greater for the second intermediate zone. However, in practice, the fact that the lens area below 30 mm is not available to the eye for use for vision provides a practical upper limit to the length of the second intermediate zone. Thus, the length in the above exemplary lens will be about 5.6 to about 9.0 mm if the depth of the reading zone provided is about 5.0 mm.

The lenses of the invention may incorporate additional power zones. For example, a third intermediate zone may be included preferably inferior to the second intermediate zone, which third intermediate zone my provide a minimum power that is equal to or greater than the reduction in power as compared to the second intermediate zone. One ordinarily skilled in the art will recognize that including additional power zones likely will result in a larger lens, which PAL wearers may not find cosmetically attractive. Thus, the preferred embodiment of the invention is a four zone multifocal lens.

The lenses of the invention may be designed and manufactured using any suitable methods. A preferred method of designing the lenses of the invention is disclosed in U.S. Pat. No. 6,302,540 incorporated in its entirety herein by reference. The four zones of the lens may be present on one surface or split between the front, or object side, and back, or eye side, surface of the lens. For example, each of the front and back surfaces may have four zones and each such zone may provide a portion of the power desired for that zone. In such an embodiment, preferably the front and the back surfaces are misaligned. By "misaligned" is meant that the surfaces, and thus the areas of unwanted astigmatism, are arranged or disposed in relation to one another so that a portion or all of the areas of maximum, localized, unwanted astigmatism, or the highest measurable level of unwanted astigmatism, contributed by one surface do not substantially coincide with one or more maximum, localized, unwanted astigmatism areas of the other surface.

Alternatively, the front or back surface of the lens may provide the far, first intermediate and near vision zones and the other lens surface may provide the second intermediate zone. In a preferred embodiment, the second intermediate zone is provided on the back surface of the lens and the near vision zone is provided on the front surface. In yet another embodiment, the lens of the invention may provide cylinder correction on one or both surfaces.

The lenses of the invention may be fabricated by any convenient means and constructed of any known material suitable for production of ophthalmic lenses. Suitable materials include, without limitation, mineral glass, polycarbonate, allyl diglycol, poly (methyl methacrylate), acrylates, polyacrylates, polyurethanes and the like. Such materials are either commercially available or methods for their production are known. Further, the lenses may be produced by any conventional lens fabrication technique including, without limitation machining, grinding, whole lens casting, molding, thermoforming, laminating, surface casting, or combinations thereof. Casting may be carried out by any means, but preferably is performed by surface casting including, without limitation, as disclosed in U.S. Pat. Nos. 5,147,585, 5,178,800, 5,219,497, 5,316,702, 5,358,672, 5,480,600, 5,512,371, 5,531,940, 5,702,819, and 5,793,465 incorporated herein in their entireties by reference. Preferably, lens manufacturing is carried out by machining both surfaces of a polymeric or mineral glass article that has planar or curved surfaces. Regardless of the manufacturing process used, the lens may include a suitable coating including, without limitation, a scratch resistant coating, an anti-reflective coating, a photochromic coating, or the like.

The invention will be clarified further by a consideration of the following, non-limiting examples.

EXAMPLES

Example 1

A lens is provided that has a front, progressive surface. The front surface add power is 2.00 diopters and the front surface base curve is 4.50 diopters and a channel length of 15 mm. The length of the near vision zone along the principal meridian is 3 mm. The back surface of the lens has a base curve of 4.50 diopters and second intermediate zone that is 4 mm in length and has a minimum power of 0.50 diopters. The second intermediate zone begins approximately 18 mm below the lens' fitting point and ends approximately 21 mm below the fitting point.

Example 2

A lens is provided that has a front progressive surface that has four zones of refractive power. The front surface base curve is 6.50 diopters with an add power of 2.00 diopters at the center of the near vision zone. The second intermediate vision zone, on the lens' front surface, has a length of approximately 6 mm a reduction of spherical power of 0.55 diopters. The back surface of the lens is a four-zone progressive surface with a base curve of 2.50 diopters, an add power of 1.00 diopters and a second intermediate zone that is 5 mm in length and a reduction of spherical power of 0.50 diopters.

Example 3

A lens is provided that has a front progressive surface that has four zones of refractive power. The front surface base curve is 5.00 diopters with an add power of 2.00 diopters at the center of the near vision zone. The channel length is 16 mm, and the length of the near vision zone is 3 mm. A second intermediate vision Zone begins at a point approximately 19 mm below the fitting point and ends approximately 26 mm below that point. The back surface of the lens is a three-zone progressive surface with a base curve of 5.00 diopters, an add power of 1.00 diopters.

Example 4

A lens is provided that has a front progressive surface that has four zones of refractive power. The front surface base curve is 5.50 diopters with an add power of 1.25 diopters at the center of the near vision zone. The channel length is 15 mm. The second intermediate vision zone begins at a point approximately 20 mm below the fitting point and ends approximately 28 mm below that point. The second intermediate zone provides a reduction of power of 0.75 diopters. The back surface of the lens is a four-zone progressive surface with a base curve of 5.50 diopters, an add power of 1.25 diopters and a second intermediate zone that is 8 mm in length, is located between approximately 20 and 28 mm below the fitting point, and provides a reduction of spherical power of 0.50 diopters. The full reduction of power is achieved at a point 26 mm below the fitting point and the power remains constant over the remaining 2 mm of the zone.

Example 5

A lens is provided that has a front progressive surface that has four zones of refractive power. The front surface base curve is 6.00 diopters with an add power of 1.50 diopters at the center of the near vision zone with a channel length of 15 mm. The second intermediate vision zone, on the lens' front surface, has a length of approximately 9 mm and provides a reduction of spherical power of 1.00 diopters. The full reduction of power occurs at the bottom of the zone, 28 mm below the fitting point. The back surface of the lens is a four-zone progressive surface with a base curve of 4.00 diopters, an add power of 1.25 diopters and a second intermediate zone that is 9 mm in length and a reduction of spherical power of 0.65 diopters.

Example 6

A lens is provided that has a front progressive surface that has four zones of refractive power. The front surface base curve is 3.00 diopters, a channel length of 16 mm, and an add power of 3.00 diopters at the center of the near vision zone. The second intermediate vision zone has a length of approximately 6 mm starting approximately 20 mm below the fitting point and providing a reduction of spherical power of 0.40 diopters. The back surface of the lens is a four-zone progressive surface with a base curve of 7.00 diopters, an add power of -1.00 diopters and a second intermediate zone that is 6 mm in length and a reduction of spherical power of 0.30 diopters. The back surface curvature increases monotonically from the fitting point, staring from 7.00 diopters, reaching 8.00 diopters at the center of the near vision zone, and increasing to approximately 8.30 diopters at the bottom of the second intermediate zone.

What is claimed is:

1. A progressive spectacle lens comprising at least four zones, each of the zones comprising a refractive power that is different from each refractive power of the other zones, said zones comprising:
   a near vision zone, and
   an intermediate vision zone located inferior to the near vision zone,
   wherein the intermediate vision zone comprises a refractive power gradually decreasing from the refractive power of the near vision zone to a minimum refractive power that is greater than about 25% to about 75% of an add power of the lens, and
   the at least four zones form a continuous surface.

2. The lens of claim 1, wherein the intermediate vision zone comprises a minimum refractive power that is greater than about 35% to about 75% of the add power of the lens.

3. The lens of claim 1, wherein the minimum power is located at the inferior-most portion of the intermediate zone.

4. The lens of claim 1, wherein the at least four zones further comprise:
   another intermediate vision zone located above the near vision zone.

5. The lens of claim 4, wherein the at least four zones further comprise:
   a distance vision zone located in an upper part of the lens above the another intermediate vision zone,
   and wherein the near vision zone comprises the add power of the lens with respect to the distance vision zone.

6. The lens of claim 5, wherein each of the distance vision zone, near vision zone and both intermediate vision zones are located on one surface of the lens.

7. The lens of claim 1, wherein the intermediate vision zone located inferior to the near vision zone comprises a superior-most border that is about 15 to about 25 mm below a fitting point of the lens.

8. The lens of claim 1, comprising a front surface and a back surface, each surface comprising at least four zones, each of the zones comprising a refractive power that is different from each refractive power of the other zones.

9. The lens of claim 8, wherein the front and the back surfaces are misaligned.

10. A method for designing a progressive spectacle lens, comprising providing at least four zones, each of the zones comprising a refractive power that is different from each refractive power of the other zones, said zones comprising:
    a near vision zone, and
    an intermediate vision zone located inferior to the near vision zone,
    wherein the intermediate vision zone comprises a refractive power that is gradually decreasing from the refractive power of the near vision zone to a minimum power that is greater than about 25% to about 75% of an add power of the lens, and
    the at least four zones form a continuous surface.

11. The method of claim 10, wherein the at least four zones further comprise:
    another intermediate vision zone located above the near vision zone.

12. The method of claim 11, wherein the at least four zones further comprise:
    a distance vision zone located in an upper part of the lens above the another intermediate vision zone,
    and wherein the near vision zone comprises the add power of the lens with respect to the distance vision zone.

* * * * *